(12) United States Patent
Lucke

(10) Patent No.: US 7,841,100 B2
(45) Date of Patent: Nov. 30, 2010

(54) ANGLE MEASURING DEVICE

(75) Inventor: Michael Lucke, Wuppertal (DE)

(73) Assignee: Eduard Wille GmbH & Co KG, Wuppertal (DE)

( * ) Notice: Subject to any disclaimer, the term of this patent is extended or adjusted under 35 U.S.C. 154(b) by 194 days.

(21) Appl. No.: 12/070,640

(22) Filed: Feb. 19, 2008

(65) Prior Publication Data

US 2008/0208522 A1    Aug. 28, 2008

Related U.S. Application Data

(60) Provisional application No. 61/005,592, filed on Dec. 5, 2007.

(30) Foreign Application Priority Data

Feb. 22, 2007    (DE)    .................. 20 2007 002 793 U

(51) Int. Cl.
    *G01B 5/24*     (2006.01)
    *G01B 7/30*     (2006.01)
(52) U.S. Cl. ........................ 33/534; 33/1 PT
(58) Field of Classification Search ................ 33/534, 33/1 PT, 1 N, 503, 549, 531, 532; 81/478, 81/479, 483
See application file for complete search history.

(56) References Cited

U.S. PATENT DOCUMENTS

| | | | | |
|---|---|---|---|---|
| 3,970,155 A | * | 7/1976 | Otto | ................. 73/862.26 |
| 4,961,035 A | * | 10/1990 | Inaba et al. | ................. 318/600 |
| 5,172,616 A | * | 12/1992 | Negishi | ................. 81/467 |
| 6,167,788 B1 | * | 1/2001 | Schonberger et al. | ......... 81/467 |
| 6,276,243 B1 | * | 8/2001 | Jenkins | ................. 81/479 |
| 6,912,791 B2 | * | 7/2005 | Tateishi et al. | ............... 33/1 PT |
| 6,922,903 B2 | * | 8/2005 | Horn | ............................ 33/549 |
| 6,959,497 B2 | * | 11/2005 | Leidinger | .................... 33/1 PT |
| 6,968,759 B2 | * | 11/2005 | Becker et al. | .................. 81/479 |
| 6,981,436 B2 | * | 1/2006 | Becker et al. | .................. 81/479 |
| 7,082,865 B2 | * | 8/2006 | Reynertson, Jr. | .............. 81/479 |
| 7,082,866 B2 | * | 8/2006 | Becker | .......................... 81/479 |
| 7,089,834 B2 | * | 8/2006 | Reynertson et al. | ........... 81/479 |
| 7,370,539 B2 | * | 5/2008 | Gharib et al. | ............. 73/862.21 |
| D575,604 S | * | 8/2008 | Vossbrinck | ................... D8/24 |
| 7,458,297 B1 | * | 12/2008 | Shiao | ........................... 81/483 |
| 7,469,602 B2 | * | 12/2008 | Gharib et al. | ............. 73/862.21 |
| 7,469,619 B2 | * | 12/2008 | Anjanappa et al. | ............ 81/479 |
| 7,493,830 B2 | * | 2/2009 | Escoe et al. | .............. 73/862.21 |
| 7,565,844 B2 | * | 7/2009 | Crass et al. | ............. 73/862.21 |
| 2003/0167648 A1 | * | 9/2003 | Winton, III | ................... 33/534 |
| 2007/0227316 A1 | * | 10/2007 | Lucke et al. | .................. 81/478 |
| 2008/0208522 A1 | * | 8/2008 | Lucke | ........................ 702/151 |
| 2009/0078057 A1 | * | 3/2009 | Schultz et al. | ........... 73/862.23 |

FOREIGN PATENT DOCUMENTS

EP      1022097 A2 * 7/2000

\* cited by examiner

*Primary Examiner*—Yaritza Guadalupe-McCall
(74) *Attorney, Agent, or Firm*—Lawrence G. Fridman

(57) ABSTRACT

The invention relates to a angle measuring device measuring the tightening angle of an operation tool for tightening screwed connections. The angle measuring device is releasabley mounted to the operating tool.

19 Claims, 1 Drawing Sheet

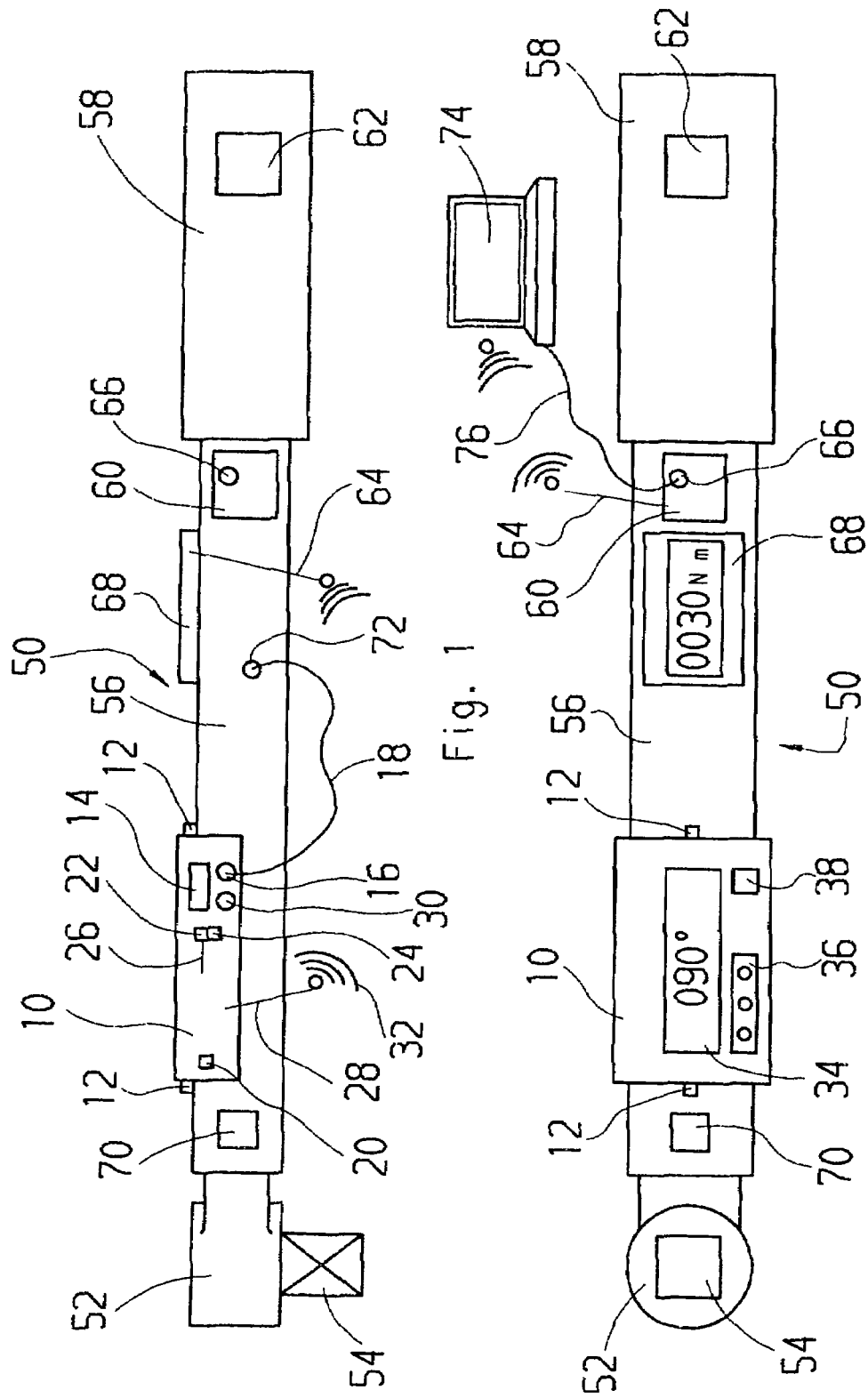

ANGLE MEASURING DEVICE

This application claims the benefit under 35 U.S.C. 119 (e) of U.S. Provisional Application No. 61/005,592 filed by Michael Lucke on Dec. 5, 2007.

FIELD OF THE INVENTION

The present invention relates to an angle measuring device measuring the tightening angle of an operating tool for tightening screwed connections, the angle measuring device is releasabley mounted to the operating tool.

BACKGROUND OF THE INVENTION

Angle measuring devices measuring the tightening angle are known in the prior art for a rotary-angle-controlled tightening of bolts or nuts. In doing so a screwed connection is tightened, for example by a torque wrench, until a predefined snug point torque is achieved. With achievement of the snug point torque the screwed connection is snugly fitted, i.e. all involved elements such like a bolt head, a nut and parts to be connected smoothly abut to each other after flattening all roughness. Subsequently another tightening operation is carried out by a further rotation according to a certain predefined rotary angle. Thus an optimal pretension of the screwed connection is achieved.

It is known in the art to connect mechanical angle measuring devices easy releasable to an operating tool. For example the German document DE 296 22 318 U1 discloses a mechanical rotary angle measurement disk comprising an angle measuring disk and an angle pointer element. The angle measuring disk is coupled to an operating tool at the rotary axis und hence follows a rotary motion of the operating tool. The angle pointer element is fixed to a work part via a support arm and reference arm respectively, thus remaining in a starting position during a rotary motion of the operating tool. A performed rotary angle is indicated to a user by the angle pointer element on the angle measuring disk.

A disadvantage of the known mechanical angle measuring devices is that they are applied directly at the position of a screwed connection requiring an adequate amount of working space. The reference arm must also be applicable and fixed respectively in the close of the screwed connection. Thus the field of application of the known mechanical angle measurement devices is restricted. Furthermore the application of the reference arm increases the amount of work on a screwed connection for a user. Moreover there is no automatic documentation of measured rotary angles possible with the known mechanical angle measuring devices.

Electronic torque wrenches with an integrated electronic measurement of a rotary angle are also known, for example from the German document DE 296 15 123. These electronic torque wrenches enable a torque measurement as well as a measurement of a rotary angle and hence are particularly suitable for a rotary-angle-controlled tightening of bolts or nuts. However, the angle measuring device of these torque wrenches is integrated non-releasable within the torque wrench with the detrimental effect that they can not be used with other operating tools.

SUMMARY OF THE INVENTION

Thus it is the object of the present invention to avoid the disadvantages of the prior art and provide an angle measuring device attachable to different operating tools with out the need of an external reference and in particular with out a reference arm for measuring a rotary angle.

According to the present invention the object is achieved in that rotary angle sensors are provided for an electronic measurement of a rotary angle to an angle measuring device as described in the beginning for measuring the tightening angle of an operating tool for tightening screwed connections. The present invention is based on the principle of using rotary angle sensors for rotary angle measurements measuring a rotary angle accomplished by a user without an external reference and in particular without a reference arm. The rotary angle sensors measure a fulfilled rotary angle relative to an initial position of the operating tool at the start time of the measurement.

The angle measurement device according to the present invention has not to be mounted to the operating tool in the adjacency of an operating head. For example a coupling to the operating tool can be carried out advantageously to a lever arm or a grip. In addition no reference arm is needed. Thus the angle measuring device is versatile applicable in limited space conditions at the location of a screwed connection. Furthermore a rotary angle measurement is facilitated for a user and quickly feasible, because a cumbersome attachment of the reference arm is omitted. A further advantage is achieved in that the angle measuring device can be coupled to different operating tools. Very economically the user needs only one angle measuring device to accomplish a rotary angle measurement with a plurality of operating tools.

An advantage embodiment of the electronic angle measuring device according to the present invention is achieved in that the rotary angle sensors are formed as acceleration sensors. For example piezo-electric sensors or sensors built up as MEMS (micro-electro-mechanical system) are applicable for acceleration sensors. Acceleration sensors measure acceleration and a respective angle of an accomplished rotary motion relative to an initial value very precise and without external reference points. Furthermore acceleration sensors are available in miniaturized design. Hence the angle measuring device according to the present invention can be realised very compact and enables a precise measurement of the rotary angle without external reference.

The rotary angle sensors are formed as gyroscopes in a further preferred variant of the angle measuring device according to the present invention. Gyroscopes are also suitable for a precise measuring of acceleration and a rotary angle respectively without an external basing point and relative to a starting value. Accordingly an accurate determination of a fulfilled rotary angle during a screwing operation without a reference is accomplishable by an angle measuring device with gyroscopes.

An appropriate embodiment of the present invention provides a display showing the measured angles respectively. During a tightening job an applied rotary angle is immediately displayed for a user. This enables a user to terminate the tightening operation exactly on the achievement of a predetermined rotary angle. In addition, by means of the display a depiction of further information is feasible, such like stored and/or predetermined rotary angles, operating conditions of the angle measuring device according to the invention or control commands and control requests respectively selectable by the user.

In one embodiment of the present invention a connection is provided for using the power supply of the operating tool. This has the advantage that a power supply in the angle measuring device is supported by the power supply of the operating tool or can be omitted totally. For example, a power supply by the operating tool can be carried out by contacts on the angle measuring device and the operating tool, by plug-and-socket connections or inductively. On the one hand the angle measuring device according to the present invention is realisable more compact and lighter. On the other hand a simplified assembly reduces the cost of production.

A microprocessor-controlled control unit with a memory, in particular for a digital storage of measured rotary angle data, is comprised in a further preferred embodiment of the present invention. With a digital storage of measured rotary angles a documentation of these rotary angles is facilitated for a user substantially by means of the microprocessor-controlled control unit. Writing the minutes or archiving measured rotary angles is enabled as far as possible automatically. Thereby a labour-intensive and error-prone manual recording of measured rotary angles is avoided. Further on predetermined rotary angles can be stored in the memory and retrieved from the memory for different tightening operations respectively, reducing workload and avoiding errors.

In an embodiment of the electronic angle measuring device according to the invention transmission means are provided for transmitting the measured rotary angle data to an external processing unit. This has the advantage that corresponding external processing capacity, memory capacity and output capacity are usable by the electronic angle measuring device. For example, measured rotary angle data can be transmitted to a PC, where they are processed, controlled and stored. Printing rotary angle data with a printer connected to the external processing unit or forwarding rotary angle data to a control centre over a data network is also enabled without difficulty.

The transmission means are advantageously formed as a radio, an infrared and/or a cable connection in an embodiment of the invention. A cable connection is very insensitive to environmental influence and ensures a secure and energy-saving transmission of data. On the other hand the mobility of a user will be not restricted in any way by an infrared or radio connection. This improves the user-friendly handling of the angle measuring device and supports the prevention of accidents. Depending on the working environment and the case of application a user will prefer a radio, an infrared or a cable connection.

According to one preferred embodiment of the present invention a data and control bus with an interface, in particular a wireless interface, to a microprocessor-controlled control unit of the operating tool is provided. Such a data and control bus enables an exchange of data and control signals between the angle measuring device and the operating tool. In particular the angle measuring device according to the present invention is controllable via the operating tool and can transmit rotary angle data to the operating tool or external processing units connected therewith for further processing. Thus, for a user an application of the angle measuring device is simplified.

In a further advantageous embodiment of the electronic angle measuring device according to the invention the operating tool and/or the angle measuring device have a trigger device transmitting a start signal and/or a stop signal for a measurement to the angle measuring device. By means of the trigger device a measurement of a rotary angle using the angle measurement device is started or stopped automatically. For example, for that purpose the operating tool can transmit an electronic signal to the angle measuring device on achievement of a snug point torque whereupon the angle measuring device begins measuring the rotary angle. With releasing torque wrenches a detection of the releasing knock, e.g. by an acoustic sensor, or a detection of the releasing bump, e.g. by acceleration sensors, is also possible. In particular a rotary-angle-controlled screwing is accomplished easier and quicker by a user with a triggered angle measurement process. If no external signal is available for triggering, a special switch can be provided for generating such a trigger signal. The switch is operated manually for starting and stopping the measurement of the rotary angle respectively.

In a preferred embodiment of the invention the operating tool comprises a releasing device. An angle is predetermined at the releasing device. If this angle is achieved the operating tool releases so that for example a screw can not be tightened any further. However, if necessary the operating tool can also generate a signal advising the user to not tighten a screw any further.

Advantageously the trigger device generates a signal which is processed by the releasing device. For this purpose the trigger device provides the releasing device with a signal as soon as a predetermined angle is achieved. The releasing device then releases the operating tool.

Further embodiments and advantages result from the subject matter of the sub-claims and the drawings with the corresponding description.

An exemplary embodiment according to the present invention is described below in greater detail with reference to the accompanying drawings.

BRIEF DESCRIPTION OF THE DRAWINGS

FIG. 1 is a side view of an exemplary embodiment of an electronic angle measuring device associated with on an operating tool; and FIG. 2 is a top view of the exemplary embodiment of an electronic angle measuring device according to FIG. 1.

DETAILED DESCRIPTION OF THE INVENTION

Referring to FIG. 1, wherein the numeral 10 denotes an electronic angle measuring device, which is efficiently mounted to an electronic torque wrench 50. Herein the electronic torque wrench 50 is shown as an example for an operating tool for tightening screwed connections. The angle measuring device 10 is also applicable with other operating tools like, for example, a mechanical measuring or releasing torque wrench, a ratchet or a screw wrench.

The electronic torque wrench 50 comprises a wrench head 52 with a square coupling 54 for coupling insertable tools as well as a lever arm 56 having a grip 58. With the lever arm 56 a user can apply a torque via the wrench head 52 and an inserting tool onto a screwing element. The torque wrench 50 is provided with a microprocessor-controlled control unit 60 for controlling and processing of measured torques. The control unit 60 is supplied with voltage by a power supply 62 and uses transmission and receiving means 64 for a wireless exchange of data with an external device. A connection element 66 like plug-and-socket contacts is provided alternatively or additionally for wired transmission of data to an external device. The electronic torque wrench 50 further comprises a display 68 showing, for example, measured torques, and a trigger device 70, which generates an electronic, acoustic, optical or tactile signal, if a predetermined torque is achieved. A voltage supply of external devices with the power supply 62 of the electronic torque wrench is enabled by a voltage connection element 72.

The electronic angle measuring device 10 comprises fastening means 12 for mounting the measuring device 10 in an easy detachable manner to the torque wrench 50. Preferable attachment is made to the lever arm 56 between the wrench head 52 and the grip 58. Attachment of the angle measuring device 10 to the wrench head 52, the grip 58 or to the end of the lever arm 56 near the grip 58 is also possible.

The angle measuring device 10 comprises a battery or accumulator 14 and/or a voltage connection element 16 for a power cable 18 for power supply. A power supply of the angle measuring device 10 can be installed by the voltage connection element 16 via the power cable 18 and the voltage connection element 72 from the power supply 62 of the wrench torque 50. For example, the voltage connection element 16 is formed as a plug-and-socket connection. Alternatively contacts are possible, which establish a connection to the power supply 62 of the torque wrench 50 during the attachment of the angle measuring device 10 to the torque wrench 50. An external power supply unit can also be connected to the voltage connection element 16 for power supply. Alternatively a power supply by solar cells or in an inductive manner is possible.

The angle measuring device 10 comprises acceleration sensors 20 as rotary angle measuring sensors, which for example are formed by piezo-electric sensors, by MEMS (Micro-Electro-Mechanical System) or by gyroscopes. By means of the acceleration sensors 20 a rotary angle fulfilled by a user is measured without an external reference and in particularly without a reference arm. This operation can be supported by a micro-processor-controlled control unit 22 within the angle measuring device 10. Further on the control unit 22 serves for controlling the angle measuring device 10 and stores measured rotary angles in a digital memory 24. For that purpose a parallel or serial data and control bus 26 is integrated into the angle measuring device 10.

A transmission of measured rotary angles to external devices or to the torque wrench 50 is carried out by transmission means 28. The transmission means 28 further enable an exchange of other data or control signals between the angle measuring device 10 and external devices or the torque wrench 50. For that purpose the transmission means 28 for example establish a radio or infrared connection. Alternatively a cable-based connection via a connection element 30 and electric or optical cables is used. For example the connection element 30 is formed as plug-and-socket connector. For establishing a connection to the torque wrench 50 it also is possible to use contacts at the angle measuring device 10, which enter into connection with corresponding contacts of the torque wrench during an attachment of the angle measuring device 10 to the torque wrench 50.

By means of the transmission means 28 an interface 32 is realised between the data and control bus 26 and the control unit 60 of the torque wrench 50 exchanging data, addresses and control signals in the herein described exemplary embodiment. Such an interface can also be established to other devices.

FIG. 2 shows a top view of the exemplary embodiment according to FIG. 1. Thus equal constituent parts are referred to with the same reference number. Referring now to FIG. 2 further parts of the angle measuring device 10 and the torque wrench 50 are described in the following.

The angle measuring device 10 further comprises a display 34 showing measured, stored or predetermined rotary angles. Further information like, for example, operating states of the angle measuring devices 10 or control commands and requests to be selected by the user are also shown to the user by the display 34. With achievement of a predetermined rotary angle the control unit generates an electronic signal for an external device or the torque wrench 50. A generation of an additional optical, acoustical or tactile signal for the user on achievement of a predetermined rotary angle is also possible with corresponding means not shown here.

The user predefines data, e.g. rotary angles, and controls the angle measuring device 10 manually by using an operating unit 36 provided to the angle measuring device 10. Thereto, for example, using the operating unit 36 the user can switch the angle measuring device on or off, start or stop a rotary angle measurement by pressing a key, store measured rotary angle to the memory 24 or transmit measured rotary angles to other devices like the torque wrench 50 using the transmission means 28 and so forth.

Optionally a measurement of a rotary angle can be started automatically. For that purpose a trigger device 38 is provided to the angle measuring device 10. For example the trigger device 38 detects an electronic signal from the torque wrench 50 and thereupon starts a rotary angle measurement. For releasing torque wrenches a not shown acoustic sensor is provided detecting a releasing knock. The detection of a releasing bump by the acceleration sensors 20 is also possible. With the trigger device 38 a rotary angle measurement is started after detection of a releasing knock or a releasing bump.

The functionality and the interaction of the several constituent parts of the angle measuring device 10 are described in detail in the following on the basis of an exemplary rotary-angle-controlled screwing operation. This is done by referring to FIG. 1 and FIG. 2 simultaneously.

At first the user couples the angle measuring device 10 to the lever arm 56 of the electronic torque wrench 50 using the fastening means 12 and assures a sufficient power supply of the angle measuring device 10, for example by connecting a power cable 18 to the voltage connection elements 16 and 72. Since the angle measuring device 10 does not has to be mounted to the wrench head 52 and no reference arm is required, the angle measuring device 10 together with the torque wrench 50 is applicable within restricted working space conditions and hence is versatile applicable. In addition, for a user the rotary-angle-controlled screwing operation is faster and easier feasible.

After an activation of the angle measuring device 10 by the user using the operating unit 36, the control unit 22 initialises the angle measuring device 10 for a rotary angle measurement. In doing so the control unit 22 establishes a, for example, radio-based interface 32 via the transmission and receiver means 64 to the control unit 60 of the torque wrench using the data and control bus 26 and the transmission means 28. A data and control signal exchange between the angle measuring device 10 and the torque wrench 50 is assured via the interface 32. The torque wrench 50 on its part is connected with an external processing unit 74 (see FIG. 2). Thereto either a wireless connection using the transmission and receiving means 28 or a wired connection using the connection element 66 and a data transmission cable 76 (see FIG. 2) is established to the external processing unit 74.

Before starting the screwing operation a rotary angle and a tightening angle respectively, can be predetermined. For that purpose a rotary angle is used, which either is stored in the memory 24 or is transmitted from the torque wrench 50 or the external processing unit 74 by the transmission means 28. A manual input of a rotary angle by the user with the operating unit 36 is also possible. Corresponding applies to a predetermined torque, e.g. a snug point torque, and the torque wrench 50.

After attaching the torque wrench 50 to the bolt or nut using an appropriate inserting tool the user begins the screwed tightening. The achievement of the snug point torque is signalled to the user by the torque wrench 50. The angle measuring device 10 detects the signal provided for the user with the trigger device 70 or receives a corresponding signal from the torque wrench 50 via the interface 32. Thereupon the angle measuring device 10 indicates the starting of the rotary angle measurement to the user and permanently displays each measured rotary angle on the display 34 during the further rotary movement. On achievement of the predetermined rotary angle the angle measuring device 10 signals the end of the rotary-angle-controlled tightening to the user. For example this can be accomplished by the display 34 or an additional provided optical, acoustical or tactile signal.

However, the signal of the trigger device can also be used to release a torque wrench 50 at a predetermined angle. For this purpose the torque wrench 50 is provided with a releasing device 78. The releasing device 78 comprises a mechanism, which prevents for example a tightening of a screw beyond a predetermined angle.

Subsequently the last measured rotary angle is stored in the memory 24 and/or transmitted over the interface 32 to the torque wrench 50 or the external processing unit 74 for documentation. The measured rotary angle and the complete rotary-angle-controlled screw tightening respectively can be controlled and archived by the external processing unit 74. The printing of a record with a printer is also possible.

By recording measured rotary angles as far as possible automatically the angle measuring device 10 simplifies a documentation of screwing operations substantially. The actual screwing operation is also feasible in an uncomplicated and speedy manner without the need of a reference arm. The angle measuring device 10 is versatile, in particular applicable under condition of limited work space and can be used by the user in a cost-saving manner with many different torque wrenches.

What is claimed is:

1. A combination of an angle measuring device adapted for measuring a tightening angle and a torque wrench provided for tightening screwed connections, said combination comprising:
   the torque wrench comprising at least a wrench head, a grip and a lever arm;
   the angle measuring device arranged to be attachable at various positions along the torque wrench;
   a fastening arrangement for detachably mounting the angle measuring device along the torque wrench; and
   at least one rotary angle sensor formed as an acceleration sensor provided for measuring a rotary angle electronically without external reference;
   wherein the angle measuring device is arranged to be selectively and detachably mounted by the fastening arrangement at such areas of the torque wrench as the wrench head, grip and lever arm.

2. The combination according to claim 1, wherein said angle measuring device is selectively and releasably mounted by means of said fastening arrangement to said torque wrench at said lever arm between the wrench head and the grip.

3. The combination according to claim 1, wherein said. acceleration sensor is selected from the group comprising piezo-electric sensors and micro-electro-mechanical systems.

4. The combination according to claim 3, wherein by means of said acceleration sensor the rotary angle is measured without the external reference and without a reference arm.

5. The combination according to claim 4, wherein operation of the torque wrench is controlled by a micro-processor-controlled unit provided for controlling the angle measuring device, so as to store measured rotary angle in a digital memory.

6. An angle measuring arrangement adapted for measuring a tightening angle of an operating tool provided for tightening screwed connections, comprising:
   an angle measuring device arranged to be attachable at various positions along the operating tool;
   a fastening arrangement for detachably mounting said angle measuring device along said operating tool; and
   at least one angle sensor formed as an acceleration sensor provided for measuring a rotary angle electronically without external reference;
   wherein said angle measuring device is arranged to be selectively and detachably mounted by said fastening arrangement at predetermined areas along said operating tool.

7. The angle measuring arrangement adapted for measuring the tightening angle of an operating tool for tightening screwed connections according to claim 6, wherein a display is provided showing the measured angles respectively.

8. The angle measuring arrangement adapted for measuring the tightening angle of an operating tool for tightening screwed connections according to claim 6, wherein a connection is provided for using a power supply of said operating tool.

9. The angle measuring arrangement adapted for measuring the tightening angle of an operating tool for tightening screwed connections according to claim 6, wherein a microprocessor-operated control unit with a memory is comprised, in particular for digitally storing measured rotary angle data.

10. The angle measuring arrangement adapted for measuring the tightening angle of an operating tool for tightening screwed connections according to claim 6, wherein transmission means is provided for transmitting measured rotary angle data to an external processing unit.

11. The angle measuring arrangement adapted for measuring the tightening angle of an operating tool for tightening screwed connections according to claim 10, wherein said transmission means is selected from the group including radio, infrared and wired connection.

12. The angle measuring arrangement adapted for measuring the tightening angle of an operating tool for tightening screwed connections according to claim 6, wherein further including a data and control bus having a wireless interface, to a microprocessor-operated control unit of said operating tool.

13. The angle measuring arrangement adapted for measuring the tightening angle of an operating tool for tightening screwed connections according to claim 6, wherein said operating tool and said angle measuring device comprise a trigger device transmitting start and stop measurement signals to said angle measuring device.

14. The angle measuring arrangement adapted for measuring the tightening angle of an operating tool for tightening screwed connections according to claim 6, wherein said operating tool comprises a release device for releasing said operation tool at a predefined angle.

15. The angle measuring arrangement adapted for measuring the tightening angle of an operating tool for tightening screwed connections according to claim 14, wherein said operating tool and said angle measuring device comprise a trigger device for generating a signal for said release device for releasing said operation tool.

16. The angle measuring arrangement adapted for measuring the tightening angle of an operating tool for tightening screwed connections according to claim 6, wherein said angle measuring device comprises:
   a display showing the respective measured angles;
   a connection for using a power supply of said operating tool;

a microprocessor-operated control unit having a memory for digitally storing measured rotary angle data;

transmission means for transmitting measured rotary angle data to an external processing unit;

a data and control bus, having a wireless interface, to a microprocessor-operated control unit of said operating tool; and a trigger device transmitting start and stop measurement signals to said angle measuring device.

17. The angle measuring arrangement adapted for measuring the tightening angle of an operating tool for tightening screwed connections according to claim 16, wherein said operating tool and said angle measuring device further comprise a trigger device for generating a signal for a release device forming a part of the operating tool for releasing said operation tool.

18. The angle measuring arrangement adapted for measuring the tightening angle of an operating tool for tightening screwed connection according to claim 6, wherein said operating tool is a torque wrench comprising at least a wrench head, a grip and a lever arm.

19. The angle measuring arrangement adapted for measuring the tightening angle of an operating tool for tightening screwed connections according to claim 18, wherein said angle measuring device is arranged to be selectively and detachably mounted by said fastening arrangement at such areas of the torque wrench as the wrench head, grip and lever arm.

* * * * *